(12) United States Patent
Wilson et al.

(10) Patent No.: US 12,456,355 B2
(45) Date of Patent: Oct. 28, 2025

(54) SELF-CHECKOUT ALERT REDUCTION BASED ON PACKAGING DETECTION

(71) Applicant: Toshiba Global Commerce Solutions Holdings Corporation, Tokyo (JP)

(72) Inventors: Paul Wilson, Cary, NC (US); Tong Yu, Cary, NC (US); Duane Miller, Wake Forest, NC (US); Timothy Crockett, Raleigh, NC (US); Jose Figueroa, Knightdale, NC (US); Craig Compton, Wake Forest, NC (US); Paul Kokkelenberg, Holly Springs, NC (US); Scott Graham, Oxford, NC (US); Suzanne Bleakley, Cary, NC (US); John Hibbard, Apex, NC (US); Charles Kurtz, Jacksonville, FL (US); Craig Turner, Raleigh, NC (US); Edna Novido, Morrisville, NC (US); Ashley Trimpey, Mebane, NC (US); D Williams, Raleigh, NC (US); Sally Ierston, Raleigh, NC (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 0 days.

(21) Appl. No.: 18/063,209

(22) Filed: Dec. 8, 2022

(65) Prior Publication Data
US 2023/0109436 A1    Apr. 6, 2023

Related U.S. Application Data

(63) Continuation of application No. 16/366,768, filed on Mar. 27, 2019, now Pat. No. 11,562,632.

(51) Int. Cl.
*G07G 1/00* (2006.01)
*G06Q 20/18* (2012.01)
*G06Q 20/20* (2012.01)

(52) U.S. Cl.
CPC ............ *G07G 1/0036* (2013.01); *G06Q 20/18* (2013.01); *G06Q 20/203* (2013.01); *G06Q 20/208* (2013.01)

(58) Field of Classification Search
CPC .... G07G 1/0036; G06Q 20/18; G06Q 20/203; G06Q 20/208
(Continued)

(56) References Cited

U.S. PATENT DOCUMENTS

| 5,083,638 A | 1/1992 | Schneider |
|---|---|---|
| 6,681,896 B1 | 1/2004 | Davis |

(Continued)

OTHER PUBLICATIONS

Dowdy, Clare. Retail Focus. FX; Oxford. Mar. 2016. (Year: 2016).*
Morrell, Liz. Analysis: Are self-service checkouts fit for purpose? Retail Week; London (Sep. 26, 2012): n/a. (Year: 2012).*

*Primary Examiner* — Fawaad Haider
(74) *Attorney, Agent, or Firm* — Patterson + Sheridan, LLP

(57) ABSTRACT

Techniques for self-checkout alert reduction based on packaging detection. A deflection in a first bag reservoir associated with a self-checkout kiosk is determined. The first bag reservoir is positioned adjacent to a packing area and includes a first type of bags. The self-checkout kiosk includes a terminal scale and further includes a platform scale in the packing area. That an empty bag is retrieved from the first bag reservoir is determined based on the deflection in the first bag reservoir. A bag type and a weight range are identified for the empty bag. An allowed weight range of a combination of the empty bag and a desired item is then determined. Presence of the empty bag on the platform scale is prevented from causing a loss prevention alert to be generated when the desired item has been placed in the empty bag on the platform scale.

20 Claims, 6 Drawing Sheets

(58) Field of Classification Search
USPC .......................................................... 705/22
See application file for complete search history.

(56) References Cited

U.S. PATENT DOCUMENTS

| | | | |
|---|---|---|---|
| 7,575,162 B1 | 8/2009 | Malchak | |
| 2008/0015956 A1* | 1/2008 | Regard | G01G 23/3728 |
| | | | 705/28 |
| 2009/0090584 A1 | 4/2009 | Chakra | |
| 2011/0161184 A1* | 6/2011 | Lutz | G06Q 30/06 |
| | | | 705/16 |
| 2016/0005019 A1* | 1/2016 | Paulo Rodrigues | G07G 1/0081 |
| | | | 705/21 |
| 2017/0354274 A1 | 12/2017 | Bacallao | |
| 2018/0222620 A1* | 8/2018 | Lewis | B65B 35/30 |
| 2018/0268664 A1 | 9/2018 | Jones et al. | |
| 2019/0066454 A1 | 2/2019 | Katayama | |
| 2021/0248881 A1 | 8/2021 | Yepez | |

* cited by examiner

SELF-CHECKOUT ALERT REDUCTION BASED ON PACKAGING DETECTION

CROSS-REFERENCE TO RELATED APPLICATIONS

This application is a continuation of co-pending U.S. patent application Ser. No. 16/366,768, filed Mar. 27, 2019, which is herein incorporated by reference in its entirety.

BACKGROUND

The present invention relates to self-checkout kiosks, and more specifically, to self-checkout kiosks used in association with packaging dispensers. Self-checkout kiosks are an increasingly popular way to manage Point-of-Sale (POS) transactions in retail environments. Individuals using such kiosks are responsible for scanning, packing, and completing the transaction themselves; allowing the individuals greater control over the exchange than at traditional terminals staffed by checkout personnel (e.g., cashiers and baggers).

SUMMARY

Embodiments presented in this disclosure provide a computer-implemented method, a system, and a non-transitory computer-readable medium to perform an operation that includes determining a deflection in a first bag reservoir associated with a self-checkout kiosk. The first bag reservoir is positioned adjacent to a packing area and includes a first type of bags. The self-checkout kiosk includes a terminal and further includes a platform scale in the packing area. The operation also includes determining that an empty bag is retrieved from the first bag reservoir, based on the deflection in the first bag reservoir. The operation also includes identifying a bag type for the empty bag. The operation also includes identifying a weight range of the empty bag based on the bag type. The operation also includes determining, in real time, an allowed weight range of a combination of the empty bag and a desired item, based on the weight range of the empty bag, a weight of the desired item, and one or more measurement tolerances. The operation also includes preventing presence of the empty bag on the platform scale from causing a loss prevention alert to be generated when the desired item has been placed in the empty bag on the platform scale.

DETAILED DESCRIPTION

Operators of self-checkout kiosks may increasingly desire to provide individual users (e.g., shoppers) with multiple options for packaging the goods processed at self-checkout kiosks. These packaging options may be provided in various materials (e.g., paper, plastic, corrugated, textile), sizes (e.g., large, medium, small, short, tall), formats (e.g., insulated, reinforced, single-use, recyclable, reusable), and types (e.g., bags, boxes, baskets, trays).

As part of the loss prevention measures of a self-checkout kiosk, items placed in the checkout area by the user are weighed to determine if an item has been (purposely or inadvertently) added to the checkout area before being scanned or otherwise included in the transaction. As different packages have different weights, the presence of a package in the checkout area can trigger a false positive in the loss prevention system, frustrating users and slowing the speed of transaction. For example, when a user places a paper or reusable shopping bag (which are typically heavier than plastic shopping bags) in the checkout area, the checkout area registers the weight of the bag. If the loss prevention system does not know the weight of the bag, the loss prevention system may not know that the added weight is due to a bag, and may assume the user has added a different item (e.g., a candy bar) to the checkout area without adding that item to the ongoing transaction. Accordingly, the loss prevention system may pause the transaction, generate an alert, etc. until an attendant or the user removes the bag from the checkout area and/or manually overrides the pause/alert. The loss prevention systems may be increasingly prone to such false positives when multiple packages of different sizes and weights are made available to the users.

To overcome these and other challenges, the present disclosure provides systems and methods for improving packaging detection at self-checkout kiosks. A package dispenser (e.g., a bag/box/basket/tray dispenser) tracks user selection of the packaging chosen and placed in the checkout area. A loss prevention system uses data on the weight of the chosen bag in conjunction with the weights of purchasable items to distinguish when a user has added packaging to the checkout area from when the user has added un-scanned items to the checkout area, thus reducing false positives in preventing losses from the retail environment. Additionally, as the package dispenser provides bags and other packaging, the additional tracking provides an operator with a count of how many of each packaging option are available at a particular package dispenser, to alert the operator when packaging inventory runs low.

Figure 1:
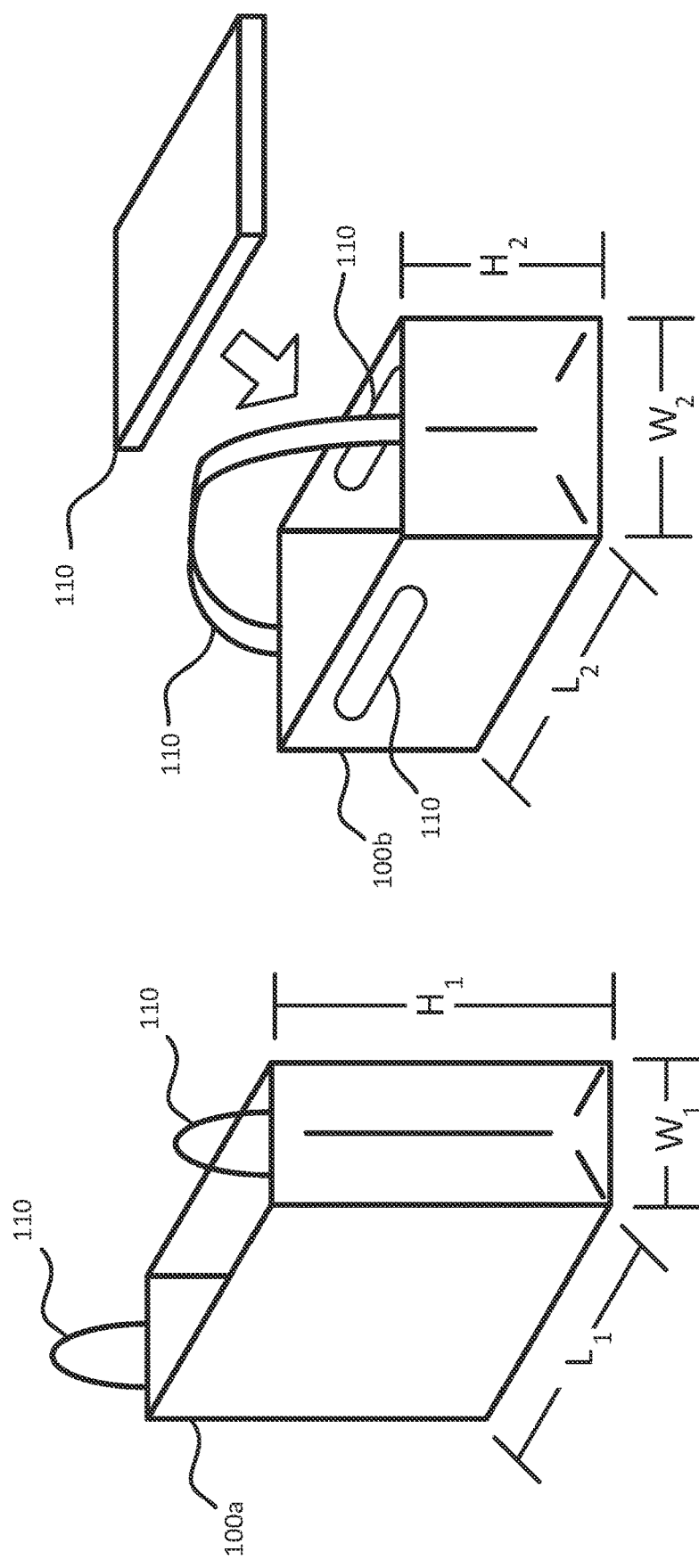
FIG. 1 illustrates a first bag and a second bag, according to aspects of the present disclosure.

FIG. 1 illustrates a first bag 100a and a second bag 100b, as may be used in aspects of the present disclosure. Although the examples provided herein primarily discuss bags, one of skill in the art will appreciate that the present disclosure is applicable to various types of packaging (e.g., boxes, baskets, trays) and the examples may freely substitute one example of packaging for another type of packaging. Additionally, as used herein, terms and units related to mass and weight may be understood interchangeably.

Both the first bag 100a and the second bag 100b may be offered to a user of a self-checkout kiosk to use during a single checkout process, despite the two bags being different from one another, and potentially having different weights. Various factors may affect the weight of a given bag, including the dimensions of the bags (e.g., length, width, height, thickness), as well as the materials used in constructing the bodies of the bags. As illustrated, the first bag 100a has a first length L1, first width W1, and a first height H1, while the second bag 100b has a second length L2, second width W2, and a second height H2 to define bags of different dimensions.

Additionally, the support features 110 included in a bag may affect the weight of that bag. For example, the first bag 100*a* includes support features 110 that include two handles, while the second bag 100*b* includes support features 110 of cutouts in the body of the second bag 100*b* defining handholds, a shoulder strap, and a stability insert. The number, type, and material of construction for the various support features may vary across bags and affect the respective weights of the two bags.

Although two bags with different dimensions and support features 110 may have the same weight, for the purposes of discussion herein, the first bag 100*a* has a different weight than the second bag 100*b*.

Figure 2A:
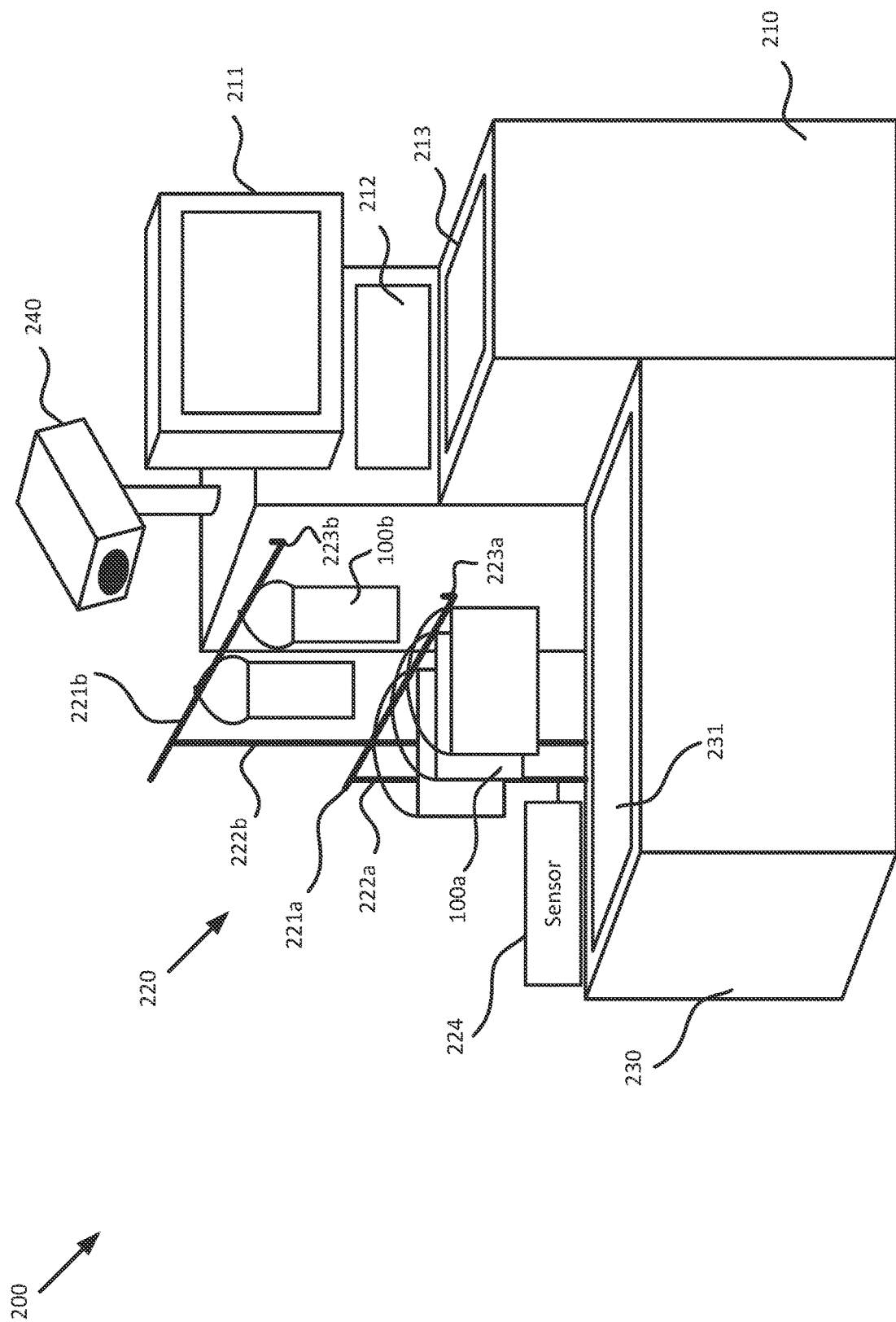
FIGS. 2A-2C illustrate self-checkout kiosks, according to aspects of the present disclosure.
Figure 2B:
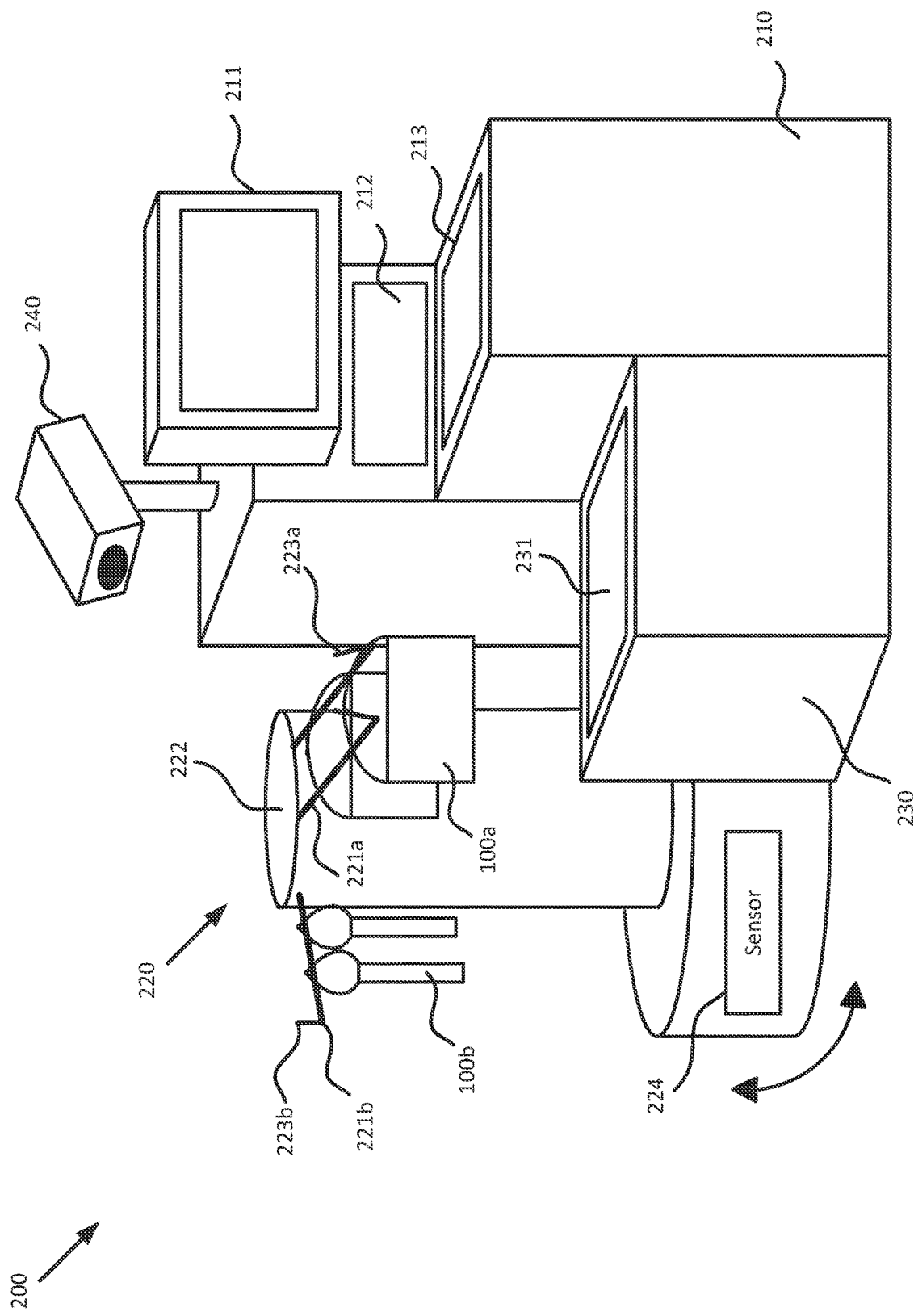
Figure 2C:
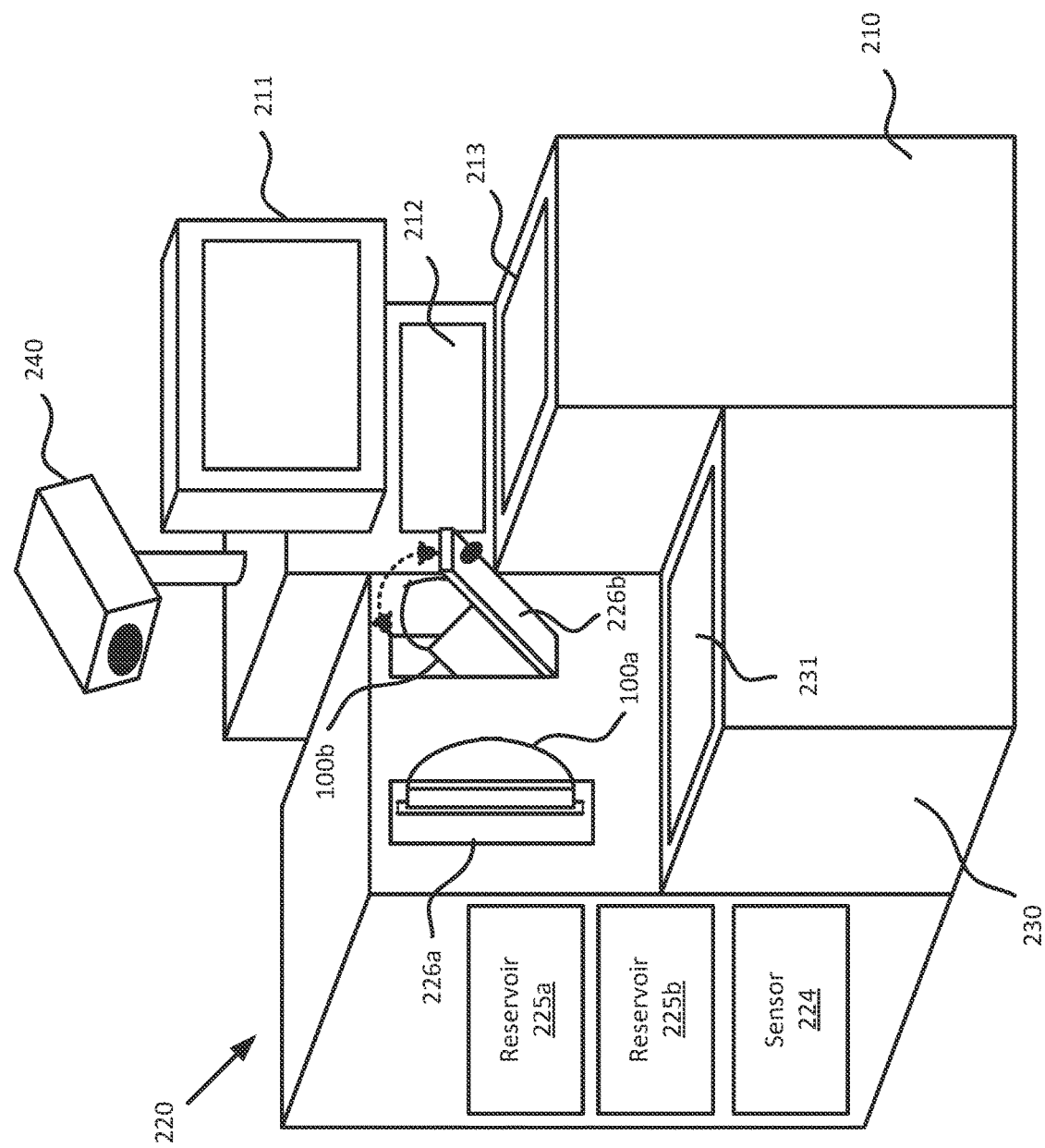

FIGS. 2A-2C illustrate a self-checkout kiosk 200 including a checkout terminal 210, various package dispensers 220 designed to dispense the first bag 100*a* and the second bag 100*b*, and a packaging platform 230. Although the example package dispensers 220 are illustrated as providing the first bag 100*a* and the second bag 100*b* for one self-checkout kiosk 200, in various aspects, a package dispenser 220 may provide more than two packaging options (e.g., three or more bags, boxes, baskets, trays, etc.) to more than one checkout terminal 210 (e.g., a shared package dispenser 220). The self-checkout kiosk 200 optionally includes a camera 240, which may be part of the checkout terminal 210, package dispenser 220, or packaging platform 230 in various aspects, that has a field of view including the package dispenser 220 and/or packaging platform 230.

The checkout terminal 210 includes a computer 211 (such as the computing device 300 discussed in relation to FIG. 3), which includes a display and various controls (e.g., a touch screen, a signature pad, buttons, a chip reader) for the user to view the ongoing exchange and provide input to the checkout terminal 210 for how to proceed. The checkout terminal 210 includes a scanner 212 to identify the various items that are part of the exchange (e.g., via a bar code or image recognition software), and may optionally include a terminal scale 213 to identify the weight of any items placed thereon, such as, for example, produce in a grocery environment. In some aspects, the checkout terminal 210 identifies the weight of an item when placed on the terminal scale 213, while in other aspects the checkout terminal 210 queries a table or database for a weight of the item. The checkout terminal 210 may be in wired or wireless communication with a package dispenser 220, a packaging platform 230, a camera 240, one or more other kiosks (e.g., an attendant kiosk, a second self-checkout kiosk), a backend database, and other devices in the retail environment (e.g., a user's phone for near field communications).

The packaging platform 230 includes a platform scale 231 that reports the weight of the items placed thereon, which may include various goods included in a transaction, packages for those goods (e.g., one or more instances of the first bag 100*a* or the second bag 100*b*), and various goods that are not included in the transaction that a user placed (inadvertently or purposely) in the packing area. The packaging platform 230 reports the weight measured by the platform scale 231 to the checkout terminal 210.

The package dispenser 220 provides packing such as the first bag 100*a* and the second bag 100*b* to the user that the user may optionally select between when packing goods as part of the ongoing transaction. In various aspects, at least some of the packaging is provided free of charge to the user, while in other aspects a user may be charged as part of the ongoing transaction for some of the packaging. For example, paper bags of a first size (e.g., the first bag 100*a*) may be freely provided to the user, while paper bags of a second size, plastic bags, cardboard boxes, reusable textile bags, (e.g., the second bag 100*b*) may be added as goods to the ongoing transaction or released from the package dispenser 220 in response to a deposit or separate transaction to provide the packaging (e.g., a coin-operated package dispenser 220).

FIG. 2A illustrates self-checkout kiosk 200 associated with a package dispenser 220 of a hanger style, in which one or more instances of the first bag 110*a* are provided on a first hanger 221*a* (generally hanger 221), and one or more instances of the second bag 110*b* are provided on a second hangar 221*b*. Each hanger 221 is adjusted to a desired height (e.g., for ease of selection by a user) by a riser 222 (individually, first riser 222*a*, second riser 222*b*, etc.). The hanger 221 runs for a known distance from the riser 222, to end at a catch 223 (individually, first catch 223*a*, second catch 223*b*, etc.) distal to the attachment point of the hanger 221 and the riser 222. In various aspects, the catch 223 prevents the bags 100 from falling off of the hanger 221 (e.g., when the hanger 221 is at an acute angle relative to the riser 222).

A hanger 221 is associated with one type of packaging. When a user removes a package of the associated type from a given hanger 221, the weight on that hanger 221 decreases, and the hanger 221 may oscillate, vibrate, or change and angle of deflection in response to the decreased weight or any forces applied by a user to remove the package from the hanger 221. Accordingly, the weight applied to the associated riser 222 also decreases. Therefore, in some aspects, a selection sensor 224 included in the package dispenser 220 may identify hangers 221 with reduced weights or that are vibrating to determine when a user has selected a given package type. The selection sensor 224 provides the determination to the checkout terminal 210 when the user has selected a particular package type, and may track how often a particular package type has been selected.

In some aspects, the selection sensor 224 is incorporated into hanger 221 to track weight and vibration via deformation of the hanger 221 along the length of the hanger 221. In some aspects, the selection sensor 224 is incorporated into a base of the riser 222 to track a weight applied to the riser 222, or a change in height of the riser 222 (e.g., rising when weight is removed, sinking when weight is added). In some aspects, the selection sensor 224 is incorporated into the junction between the riser 222 and the hanger 221 to identify a change in the angle of deflection of the hanger 221 relative to the riser 222. In some aspects, the selection sensor 224 is a light curtain, a photodiode, a proximity sensor, etc. included in the catch 223 to detect when a bag 100 passes over the catch 223, such as when a user selects and removes a bag 100 from a particular hanger 221.

FIG. 2B illustrates self-checkout kiosk 200 associated with a package dispenser 220 of a carousel style, in which one or more instances of the first bag 110*a* are provided on a first hanger 221*a*, and one or more instances of the second bag 110*b* are provided on a second hangar 221*b*. Each hanger 221 is provided from a shared riser 222, although each hanger 221 may be provided at different heights from the shared riser 222. The hangers 221 runs for known distances from the shared riser 222, to end at a catch 223 (individually, first catch 223*a*, second catch 223*b*, etc.) distal to the attachment point of the hanger 221 and the shared riser 222. In various aspects, the catch 223 prevents the bags 100 from falling off of the hanger 221 (e.g., when the hanger 221 is at an acute angle relative to the riser 222).

The shared riser 222 is selectively rotatable around a vertical axis thereof to a variety of positions, which may present different bags 100 into the reach of the user, and place other bags 100 out of reach of the user. As illustrated, the shared riser 222 is rotated to present the first bags 100*a* to the user, and position the second bags 100*b* out of reach of the user when standing at the checkout terminal 210, but the shared riser 22 may be rotated to present the second bags 100*b* to the user are move the first bags 100*a* out of reach of the user.

In addition to the example selection sensors 224 discussed in relation to FIG. 2A, a selection sensor 224 used with a carousel style package dispenser 220 may also report a rotational position of the shared riser 222 to the checkout terminal 210 when a bag 100 is selected (e.g., via a change in weight, angle/deflection of a hanger 221, vibration, or detection of a bag 100 passing over the catch 223).

FIG. 2C illustrates self-checkout kiosk 200 associated with a package dispenser 220 of a reservoir style, in which one bag 100 at a time (or one bag 100 of a given type at a time) is provided to the user. The individual bags 100 are provided from an associated reservoir 225 to an associated interface 226 (e.g., first bags 100*a* from a first reservoir 225*a* to a first interface 226*a*, second bags 100*b* from a second reservoir 225*b* to a second interface 226*b*, etc.) A bag 100 may be made available from the associated reservoir 225 based on a user selection from the display, user actuation of a control on the package dispenser 220, the user removing a bag 100 from an interface 226, or the interface 226 being moved to a loading position.

For example, when a user removes an exposed first bag 110*a* from the first interface 226*a*, a plurality of first bags 100*a* stored in the first reservoir 225*a* may be connected to the exposed first bag 110*a*, and a new first bag 110*a* is pulled into the first interface 226*a*, and becomes a new exposed bag 100*a*, which may in turn be removed by a user and pull another first bag 100*a* into the first interface 226*a*.

In another example, a user may select a second bag 110*b* by pulling a second interface 226*b* into a dispensing position, and remove the second bag 110*b* from the second interface 226*b*. When the user returns the second interface 226*b* to a reloading position (or the second interface 226*b* returns to the reloading position via springs or similar mechanism) the second reservoir 225*b* inserts a new second bag 100*b* into the second interface 226*b* for later selection by the user.

A selection sensor 224 may track the removal from or insertion into an associated interface 226 of a given bag 100 and transmit the selection of the given bag 100 to the checkout terminal 210. In various aspects, the selection sensor 224 is included in a reservoir 225 to measure a height/depth/weight of bags 100 in the reservoir 225 that is correlated with a known number of bags 100. In some aspects, the selection sensor 224 includes a roller wheel that revolves when a bag 100 is removed from the package dispenser 220 to count when bags 100 of a given type are selected. In some aspects, the selection sensor 224 is a light curtain, a photodiode, a proximity sensor, etc. included in the interface 226 to detect when a bag 100 is removed from the interface 226 by a user.

In addition to or instead of the various sensors incorporated into the package dispenses 220 discussed in relation to FIGS. 2A-2C, a camera 240 may be provided to visually identify a type of package selected by a user. The camera 240 may differentiate the first bag 100*a* from the second bag 100*b* based on the size, shape, color, location from which the bag 100 was selected, or a visual indicator on a given bag 100 (e.g., a QR (Quick Response) code, a UPC (Universal Product Code), a logo). The camera 240 provides the determination to the checkout terminal 210 when the user has selected a particular package type, and may track how often a particular package type has been selected.

Figure 3:
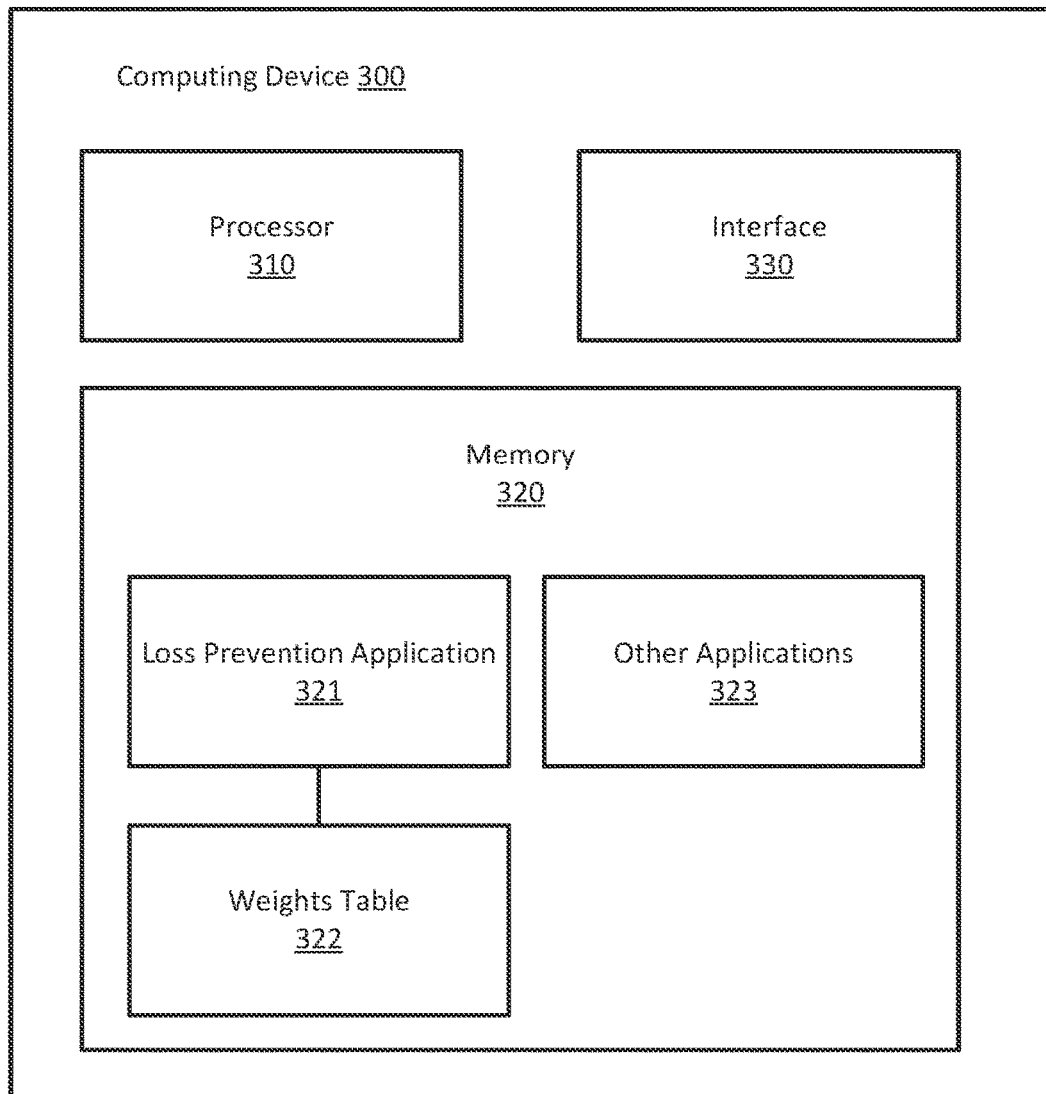
FIG. 3 illustrates a block diagram of a computing device according to aspects of the present disclosure.

FIG. 3 illustrates a block diagram of a computing device 300 that includes a processor 310, a memory 320, and a network interface device 330, and may include other components such as additional storage, an input device, and an output device. The computing device 300 is generally under the control of an operating system (not shown). The processor 310 is included to be representative of a single CPU, multiple CPUs, a single CPU having multiple processing cores, and the like. The interface 330 may be any type of network communications device allowing the computing device 300 to communicate with other computers via a network, such as the Internet or a Local Area Network (LAN) via wireline or wireless communications.

The memory 320 may be a persistent or a volatile storage device. Although the memory 320 is shown as a single unit, the memory 320 may be a combination of fixed and/or removable non-transient computer readable memory storage devices, such as fixed disc drives, solid state drives, SAN storage, NAS storage, removable memory cards or optical storage. The memory 320 may be part of one virtual address space spanning multiple primary and secondary storage devices.

As shown, the memory 320 includes a loss prevention application 321, a weights table 322, and may include other applications 323 (including Operating Systems for the computing device 300). The loss prevention application 321 may include instructions, that when performed by the processor 310, enable the computing device 300 to perform the operations described in the present application, including, but not limited to the operation described in relation to method 400 of FIG. 4. The weights table 322 includes the weight ranges of various packages (e.g., the weights of the first bag 100*a* and the second bag 100*b*) that may be selected by a user, the weights of various goods or items that may be included in the transaction, the tolerances of the terminal scale 213 and the platform scale 231, and measured values for any goods or items placed on the terminal scale 213 or the platform scale 231 during the course of the transaction. In various aspects, the weights table 322 may be maintained on the computing device 300 or maintained on another computer that is accessible to the computing device 300 over a network.

Figure 4:
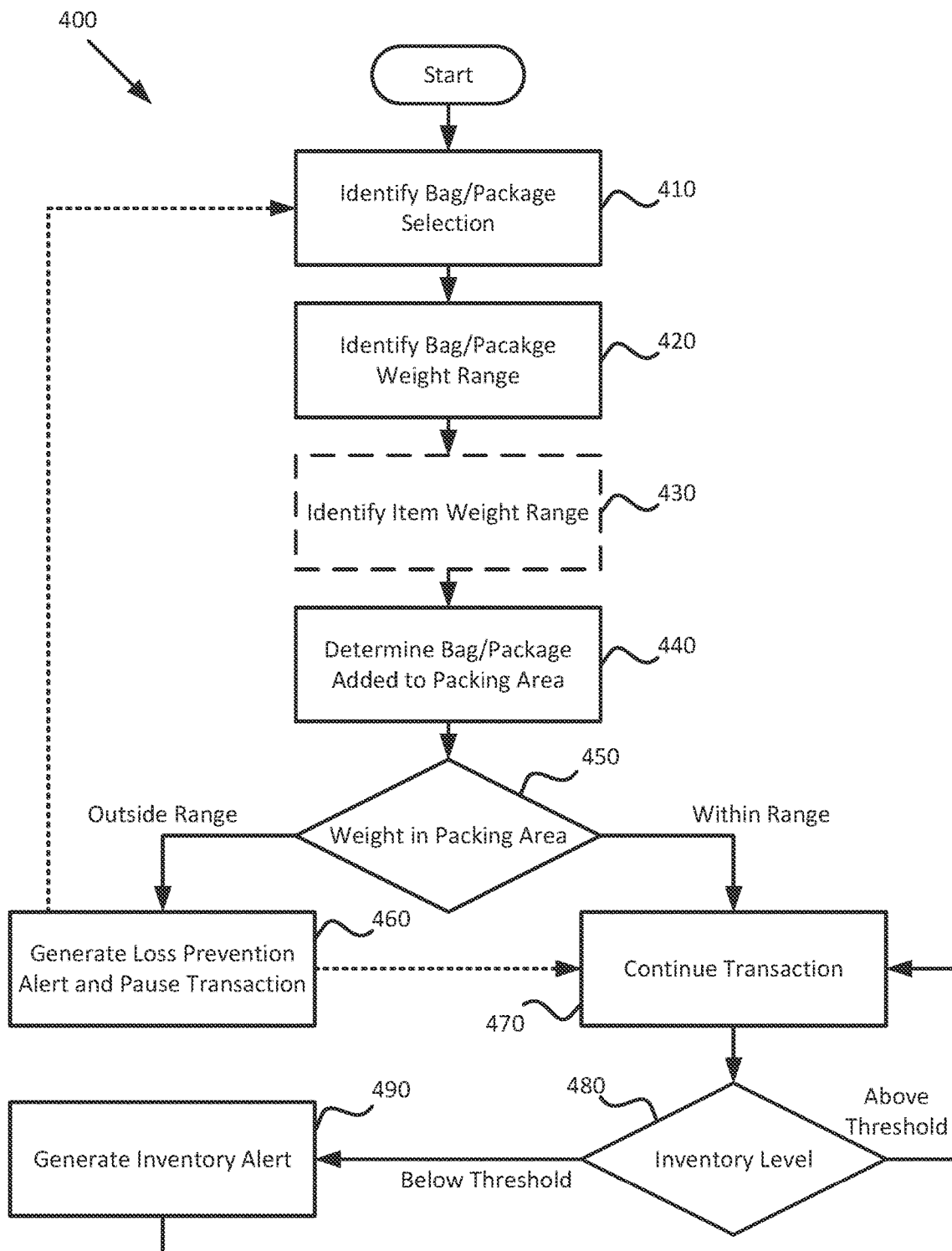
FIG. 4 is a flowchart of a method for tracking package selection for managing loss prevention for a transaction at a self-checkout kiosk, according to aspects of the present disclosure.

FIG. 4 is a flowchart of a method 400 for tracking package selection for managing loss prevention for a transaction at a self-checkout kiosk 200. Method 400 begins with block 410, where the selection sensor 224 (and/or the camera 240) identifies a bag selection made by a user. In various aspects, the selection sensor 224 identifies the bag 100 selected by the user based on the portion of the package dispenser 220 (e.g., a hanger 221, riser 222, or reservoir 225) noted by the selection sensor 224 as experiencing a change in weight, deformation, height/depth, or experiencing vibrations. In some aspects, the selection sensor 224 identifies the bag 100 selected based on an indication (e.g., via a roller, actuator, or light sensor) of a bag 100 being removed from a particular portion of the package dispenser 220 (e.g., a first hanger 221*a*, a second interface 226*b*, etc.).

At block 420, the loss prevention application 321 determines the weight range for the type of bag/package determined to have been selected at block 410. The loss prevention application 321 may identify the weight range for the given package type from the nominal weight values stored for that bag/package type in a weights table 322 and the tolerances of the platform scale 231 in the packing area stored in the weights table 322. For example, if a first bag 100a is selected at block 410, the weights table 322 may indicate that bags of the first type have a weight between 50 and 70 grams (g), and the platform scale 231 is accurate within 5 g (i.e., ±5 g), and the weight range for the first bag 100a is therefore 45-75 g in the present example.

At block 430, the loss prevention application 321 optionally identifies the weight of any items that are included in the transaction and still need to be moved to the packing area. For example, a user may select a new package (per block 410) in response to scanning an item and deciding that the current packages are full, that the item should be placed in a separate package, or that there are no packages currently available in the packing area. In some aspects, the user may select the package, place the item in the package, and place the combined package and item in the packing area in one motion. The loss prevention application 321 therefore may determine the combined weight of the package and the item (or items) that have been added to the transaction (e.g., scanned at the checkout terminal 210), but have not been placed in the packing area (e.g., on the platform scale 231). The loss prevention application 321 may look up the weight range of the item from the weights table 322, or use a measured value (including a measurement tolerance) from the terminal scale 213. For example, when a user scans a can of soup, the loss prevention application 321 may query the weights table 322 to determine that the weight range for that particular variety of soup is between 440 and 470 g. Therefore, using the preceding example weight ranges (i.e., 45-75 g and 440-470 g), the loss prevention application 321 determines that the combined weight range of the package and the can of soup is between 485-545 g. In another example, when a user adds a cabbage determined to weigh 300 g to the transaction, the loss prevention application 321 may determine the item weight range based on the weight measured by the terminal scale 213 (i.e., 300 g in this example) in combination with an accuracy of the terminal scale 213 stored in the weights table 322. In the present example, if the terminal scale 213 is accurate within 10 g (i.e., ±10 g) and package weight range is 45-75 g, the combined weight range of the bag/package and the cabbage is 335-385 g.

At block 440, the loss prevention application 321 determines whether the package has been moved to the packing area of the packaging platform 230 (e.g., the platform scale 231). In some aspects, the loss prevention application 321 determines that the package has been moved to the packing area when the camera 240 captures one or more images that indicates that user has placed the bag/package and/or any scanned items in the packing area. In some aspects, the loss prevention application 321 determines that the package has been moved to the packing area when the terminal scale 213 indicates that the weight placed thereon has increased and settled to a steady reading.

At block 450, in response to the loss prevention application 321 determining that the package has been moved to the packing area (per block 440), the loss prevention application 321 determines whether the difference between the weights measured on the platform scale 231 before and after the package being moved to the packing area fall within the package/bag weight range or the combined weight range for the package/bag and the item(s). When the difference between the before/after weights falls within the weight range of the package, method 400 proceeds to block 470. When the difference between the before/after weights falls outside of the weight range of the package, method 400 proceeds to block 460. However, in aspects in which at least one item was identified as being added to the transaction and not-yet moved to the packing area (e.g., when the user scans the item and then selects the package to pack the item in), when the difference between the before/after weights falls outside of the weight range of the package, the loss prevention application may override the initial determination to proceed to block 460 if the difference falls within the combined weight range. For example, a user may place a bag 100 and an already-scanned item on the platform scale 231 at the same time, which may weigh more than the allowed weight range for the bag 100, but should weigh within the combined weight range and is not indicative of a (inadvertent or purposeful) movement of unscanned goods to the packing area, and thus should not generate a loss prevention alert.

At block 460, the loss prevention application 321 generates a loss prevention alert and pauses the transaction; preventing the user from finalizing or adding more items to the transaction until the transaction is unpaused. In some aspects, the loss prevention alert signals an attendant of the alert (e.g., via a beacon on the checkout terminal 210, an audio speaker, or by transmitting the alert to an attendant kiosk). The loss prevention alert may also be presented to the user by audio visual means with instructions for how to unpause the transaction. For example, the checkout terminal 210 may play an audio clip to "remove the bag and any unscanned items from the packing area and try again". In various aspects, the transaction may be paused until an attendant provides an authorization for the transaction to continue or restart, the user complies with directions to return the weight in the packing area to a pre-alert state, or the user restarts the transaction. Once the loss prevention application 321 verifies that the user has complied with the instructions (e.g., by returning the weight in the packing area to a pre-alert state) or an attendant has authorized the transaction to resume, method 400 may proceed to block 470 or restart at block 410.

At block 470, the loss prevention application 321 allows the transaction to continue. When continuing the transaction, the user may scan additional goods, supply coupons/loyalty program information, submit payment information, etc. Method 400 may continue at block 470 until the transaction is complete, or the user reinitiated method 400 at block 410 by selecting a new bag/package for use in the packing area.

In various aspects, as part of the transaction or after the transaction is complete, the loss prevention application 321 updates a count for the package type(s) selected and noted as being placed in the packing area (per blocks 410 and 440), and proceeds to block 480 to determine an inventory level of the type of the selected package for the package dispenser 220 associated with self-checkout kiosk 200. When the inventory level in the package dispenser 220 for the type of package selected is above an inventory/refill threshold, the transaction (if ongoing) may continue, and method 400 returns to block 470. When the inventory level in the package dispenser 220 to the type of package selected is at or below an inventory threshold, method 400 proceeds to block 490.

At block 490, the loss prevention application 321 (or another application 323 associated with package inventory control), generates an inventory alert. In various aspects, the alert is transmitted to an attendant kiosk, a backend server, or an alert beacon, such as, for example, a "refill reservoir" light on the package dispenser 220. Method 400 then returns to block 470 to continue the transaction (if ongoing) or may then conclude.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   initiating, by an application, a self-checkout process at a self-checkout kiosk, the self-checkout kiosk comprising a platform scale in a packing area and a terminal scale outside of the packing area, the terminal scale configured for item weighing prior to packing, the platform scale configured for item weighing during or after packing, wherein the self-checkout kiosk is associated with a first bag reservoir, the first bag reservoir being adjacent to the packing area and comprising a riser and a hanger running from the riser, the hanger configured to hang a first type of bags;
   determining, by the application via a sensor, a deflection of the hanger in the first bag reservoir, the deflection comprising an angle change of the hanger relative to the riser;
   determining, by the application, that an empty bag is retrieved from the first bag reservoir, based on the deflection of the hanger in the first bag reservoir;
   identifying, by the application, a bag type for the empty bag based on the first bag reservoir, the bag type being predefined;
   identifying, by the application, a weight range of the empty bag based on the bag type, the weight range being predefined;
   determining, in real time by operation of one or more computer processors when executing the application, an allowed weight range of a combination of the empty bag and a desired item, based on the weight range of the empty bag, a weight of the desired item, and one or more measurement tolerances, the one or more measurement tolerances being predefined; and
   preventing, by the application, presence of the empty bag on the platform scale from causing a loss prevention alert to be generated when the desired item has been placed in the empty bag on the platform scale.

2. The computer-implemented method of claim 1, wherein the weight of the desired item is identified from a weights table based on an item identifier obtained from scanning the desired item at a terminal associated with the terminal scale.

3. The computer-implemented method of claim 1, wherein the weight of the desired item is measured by the terminal scale.

4. The computer-implemented method of claim 3, wherein the one or more measurement tolerances includes at least one of a measurement tolerance of the terminal scale and a measurement tolerance of the platform scale.

5. The computer-implemented method of claim 1, wherein the preventing includes determining that addition of the empty bag and the desired item to the packing area increases a total weight, associated with the packing area and measured by the platform scale, by no more than the allowed weight range, whereupon no loss prevention alert is generated.

6. The computer-implemented method of claim 1, wherein the sensor comprises a light curtain, a photodiode, or a proximity sensor, and wherein the deflection comprises an angle change of the hanger relative to the riser.

7. The computer-implemented method of claim 1, wherein the self-checkout kiosk further comprises a second bag reservoir comprising a second type of bag.

8. A system comprising:
   one or more computer processors; and
   a memory containing a program executable by the one or more computer processors to perform an operation comprising:
      initiating a self-checkout process at a self-checkout kiosk, the self-checkout kiosk comprising a platform scale in a packing area and a terminal scale outside of the packing area, the terminal scale configured for item weighing prior to packing, the platform scale configured for item weighing during or after packing, wherein the self-checkout kiosk is associated with a first bag reservoir, the first bag reservoir being adjacent to the packing area and comprising a riser and a hanger running from the riser, the hanger configured to hang a first type of bags;
      determining, via a sensor, a deflection of the hanger in the first bag reservoir;
      determining that an empty bag is retrieved from the first bag reservoir, based on the deflection of the hanger in the first bag reservoir;
      identifying a bag type for the empty bag based on the first bag reservoir, the bag type being predefined;
      identifying a weight range of the empty bag based on the bag type, the weight range being predefined;
      determining, in real time, an allowed weight range of a combination of the empty bag and a desired item, based on the weight range of the empty bag, a weight of the desired item, and one or more measurement tolerances, the one or more measurement tolerances being predefined; and
      preventing presence of the empty bag on the platform scale from causing a loss prevention alert to be generated when the desired item has been placed in the empty bag on the platform scale.

9. The system of claim 8, wherein the weight of the desired item is identified from a weights table based on an item identifier obtained from scanning the desired item at a terminal associated with the terminal scale.

10. The system of claim 8, wherein the weight of the desired item is measured by the terminal scale.

11. The system of claim 10, wherein the one or more measurement tolerances includes at least one of a measurement tolerance of the terminal scale and a measurement tolerance of the platform scale.

12. The system of claim 8, wherein the preventing includes determining that addition of the empty bag and the desired item to the packing area increases a total weight, associated with the packing area and measured by the platform scale, by no more than the allowed weight range, whereupon no loss prevention alert is generated.

13. The system of claim 8, wherein the sensor comprises a light curtain, a photodiode, or a proximity sensor, and wherein the deflection comprises an angle change of the hanger relative to the riser.

14. The system of claim 8, wherein the self-checkout kiosk further comprises a second bag reservoir comprising a second type of bag.

15. A non-transitory computer-readable medium containing a program executable to perform an operation comprising:
   initiating a self-checkout process at a self-checkout kiosk, the self-checkout kiosk comprising a platform scale in a packing area and a terminal scale outside of the packing area, the terminal scale configured for item weighing prior to packing, the platform scale configured for item weighing during or after packing, wherein the self-checkout kiosk is associated with a first bag reservoir, the first bag reservoir being adjacent to the packing area and comprising a riser and a hanger running from the riser, the hanger configured to hang a first type of bags;
   determining, via a sensor, a deflection of the hanger in the first bag reservoir;
   determining that an empty bag is retrieved from the first bag reservoir, based on the deflection of the hanger in the first bag reservoir;
   identifying a bag type for the empty bag based on the first bag reservoir, the bag type being predefined;
   identifying a weight range of the empty bag based on the bag type, the weight range being predefined;
   determining, in real time by operation of one or more computer processors when executing the program, an allowed weight range of a combination of the empty bag and a desired item, based on the weight range of the empty bag, a weight of the desired item, and one or more measurement tolerances, the one or more measurement tolerances being predefined; and
   preventing presence of the empty bag on the platform scale from causing a loss prevention alert to be generated when the desired item has been placed in the empty bag on the platform scale.

16. The non-transitory computer-readable medium of claim 15, wherein the weight of the desired item is identified from a weights table based on an item identifier obtained from scanning the desired item at a terminal associated with the terminal scale.

17. The non-transitory computer-readable medium of claim 15, wherein the weight of the desired item is measured by the terminal scale.

18. The non-transitory computer-readable medium of claim 17, wherein the one or more measurement tolerances includes at least one of a measurement tolerance of the terminal scale and a measurement tolerance of the platform scale.

19. The non-transitory computer-readable medium of claim 15, wherein the preventing includes determining that addition of the empty bag and the desired item to the packing area increases a total weight, associated with the packing area and measured by the platform scale, by no more than the allowed weight range, whereupon no loss prevention alert is generated.

20. The non-transitory computer-readable medium of claim 15, wherein the sensor comprises a light curtain, a photodiode, or a proximity sensor, and wherein the deflection comprises an angle change of the hanger relative to the riser.

* * * * *